United States Patent [19]
Huber et al.

[11] Patent Number: 5,980,424
[45] Date of Patent: Nov. 9, 1999

[54] TORQUE DITHERING METHOD FOR CONTROLLING A VEHICLE TRANSMISSION

[75] Inventors: Jon M. Huber, Laurinburg, N.C.; Christopher S. Keeney, Troy; Edward M. Bacon, Northville, both of Mich.

[73] Assignees: Detroit Diesel Corporation, West Detroit; Meritor Heavy Vehicle Systems, LLC, Troy, both of Mich.

[21] Appl. No.: 08/955,842

[22] Filed: Oct. 21, 1997

[51] Int. Cl.$^6$ .................................................... B60K 41/08
[52] U.S. Cl. ................................................................ 477/109
[58] Field of Search ................................... 477/109, 110, 477/111

[56] References Cited

U.S. PATENT DOCUMENTS

| | | |
|---|---|---|
| 4,474,083 | 10/1984 | Braun . |
| 4,493,228 | 1/1985 | Vukovich et al. . |
| 4,593,580 | 6/1986 | Schulze . |
| 4,850,236 | 7/1989 | Braun . |
| 5,261,298 | 11/1993 | Markyvech . |
| 5,487,004 | 1/1996 | Amsallen ............................ 477/109 X |
| 5,571,059 | 11/1996 | Desautels et al. ...................... 477/111 |
| 5,573,477 | 11/1996 | Desautels et al. . |
| 5,582,558 | 12/1996 | Palmeri et al. ......................... 477/109 |
| 5,583,766 | 12/1996 | Birchenough et al. ............. 477/109 X |
| 5,595,551 | 1/1997 | Hedstrom et al. ...................... 477/109 |
| 5,679,093 | 10/1997 | Desautels et al. ...................... 477/109 |

*Primary Examiner*—Dirk Wright
*Attorney, Agent, or Firm*—Howard & Howard

[57] ABSTRACT

A dithering torque control method that is useful for a semi-automated vehicle transmission facilitates accomplishing a desired condition in the transmission. The method is useful during an initial break torque function to relieve drive train torque so that a driver can move a manual shift lever from an engaged position to a transmission neutral position without using a clutch. The method is also useful for shifting a lever to move gearing components from a neutral position to a next desired gear. A dithering function is used to cyclically oscillate a current torque value about a target torque value that is associated with the desired transmission condition. An amplitude and period of the dithering function are determined based upon an overall gear ratio of the transmission. The dithering function begins at a point dependent on a torque value associated with the currently engaged gear. The dithering function continues until a known transmission condition is confirmed.

18 Claims, 2 Drawing Sheets

TORQUE DITHERING METHOD FOR CONTROLLING A VEHICLE TRANSMISSION

BACKGROUND OF THE INVENTION

This invention generally relates to a method of controlling a change in a torque value of a semi-automated vehicle transmission system that oscillates a torque value about a target torque value.

Vehicle transmissions are well known and include automatic, manual and semi-automatic types. Each of the transmission types have advantages that make them suitable for various applications. Heavy duty vehicles typically include a manual or, more recently, a semi-automatic transmission. Semi-automatic transmissions of various types have been proposed. The basic principal is to assist a driver in performing a manually selected gear ratio change using a system that is at least partially automated. While such transmissions are becoming more readily useable, those skilled in the art are still trying to enhance and perfect current designs.

In conventional manual transmissions, to effect a gear change, the driver of the vehicle would manually operate a clutch and a gear shift lever. The clutch was used to disengage the output shaft of the engine from the input shaft of the transmission so that the driver would be able to move the transmission out of a current gear into a neutral position. To then re-engage a new gear, the driver would have to operate the clutch, move the lever and approximate a desired engine speed that would correspond to an appropriate torque for engaging the new gear. Traditionally, this has been a relatively difficult maneuver requiring a great degree of skill and experience.

One challenge facing a designer of a semi-automatic transmission system is to simplify the task of shifting gears and doing so in an efficient and effective manner. This invention provides an effective method for establishing conditions that simplify effecting a gear change in an efficient manner.

SUMMARY OF THE INVENTION

In general terms, this invention is a method of controlling a torque value in a vehicle transmission that allows a driver to manually move a shift lever to change gears. The basic goal is to achieve a zero torque condition that allows the driver to move the shift lever to disengage a currently engaged gear without requiring the driver to manually operate the clutch. The same method is useful for achieving torque conditions that allow a smooth transition and engagement of a chosen gear at the end of a shift.

The method of this invention has several basic steps. First, a target torque value is determined. The current torque value, which can be considered an initial torque value at the beginning of a shift, indicates a current transmission condition including the currently engaged gear. An electronic controller changes the torque value so that the torque value approaches the target torque value. The torque value preferably is controlled by controlling the fuel supply rate to the engine. When the current torque value reaches a preselected value relative to the target torque value, the current torque value is then cyclically oscillated about the target torque value as a function of time. The function of time preferably is sinusoidal in shape. The sinusoidal function preferably has an amplitude and period that are determined based upon an overall gear ratio of the transmission. The torque value is oscillated about the target torque value until a neutral condition exists in the transmission or a preselected time period has elapsed.

When the initial torque value associated with a currently engaged gear is relatively high compared to the target torque value, the change from the initial torque value to the target torque value is accomplished using an exponential decay function. The decay function preferably is accomplished by filtering the electronic signals utilized by an electronic controller to control the torque value of the transmission. The filter used for the filtering is chosen based upon an overall gear ratio of the transmission.

When the initial torque value at the currently engaged gear is relatively low compared to the target torque value, the change in current torque value is accomplished in the following general manner. The current torque value is commanded to instantaneously change to a dither torque value on an opposite side of the target torque value from the initial current torque value. In other words, if the initial current torque value is greater than the target torque value, then the torque value is changed to a torque value equal to the target torque value minus a determined dither torque value. The dither torque value is determined as a function of an overall gear ratio of the transmission. If the initial current torque value is less than the target torque value, then the current torque value is changed to a value equal to the target torque value plus the determined dither torque value. Then the preferably sinusoidal oscillation is performed.

The various features and advantages of this invention will become apparent to those skilled in the art from the following detailed description of the preferred embodiment. The drawings that accompany the detailed description can be described as follows.

DETAILED DESCRIPTION OF THE PREFERRED EMBODIMENT

Figure 1:
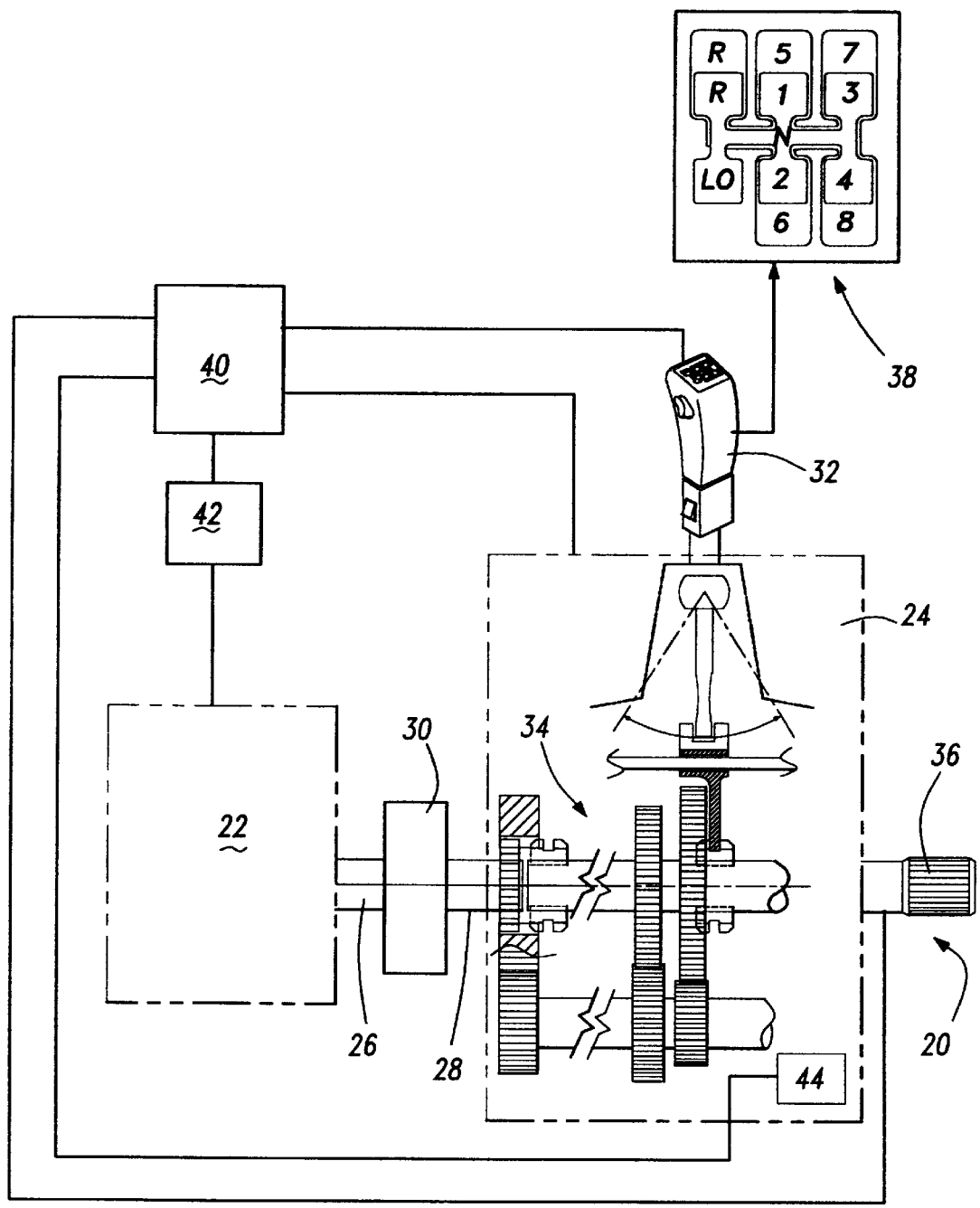
FIG. 1 is a schematic illustration of a vehicle transmission system.

FIG. 1 schematically and diagrammatically illustrates a vehicle transmission system 20. An engine 22 provides a motive force to propel a vehicle by driving a transmission 24. The engine 22 includes an output shaft 26 that causes rotation of a transmission input shaft 28 through a master clutch 30. A manual shift lever 32 allows a driver to manipulate gears within a gearing arrangement 34 to alter a gear ratio between the transmission input shaft 28 and a transmission output shaft 36. The transmission output shaft 36 drives the wheels of the vehicle in a conventional manner. The shift lever 32 can be moved in a pattern as illustrated at 38 to achieve various operating gear ratios within the transmission 24.

An electronic controller 40 provides semi-automatic control of the transmission system 20. The controller 40 is schematically illustrated. The controller 40 can be realized, as will be appreciated by those skilled in the art, by one or more microcomputers, custom designed microcontrollers, software, dedicated circuitry or a combination of one or more of these. The controller 40 controls the engine 22 primarily by controlling the amount of fuel supplied to the engine 22 through a fuel control schematically illustrated at 42. By controlling the amount of fuel supplied to the engine 22, the rotational speed of the engine output shaft 26 is controlled. Automatically controlling the fuel supply to the engine 22 provides automatic torque control. A plurality of sensors schematically illustrated at 44 provide information to the control 40 regarding gear placement and ratios within the transmission 24.

The transmission system 20 preferably is controlled in a manner similar to that disclosed in U.S. Pat. No. 5,582,558. The teachings of that patent are incorporated into this specification by reference.

The transmission system 20 preferably is used to allow a driver to accomplish a desired gear change without requiring the driver to operate the clutch 30. This is generally accomplished by controlling the rotational speed of the engine output shaft 26, using the controller 40, to achieve a zero torque condition within the transmission 24. The zero torque condition allows the driver to manipulate the shift lever 32 to disengage a currently engaged gear. The method of this invention is useful for effectively and efficiently achieving the necessary zero torque condition within the transmission 24.

Figure 2:
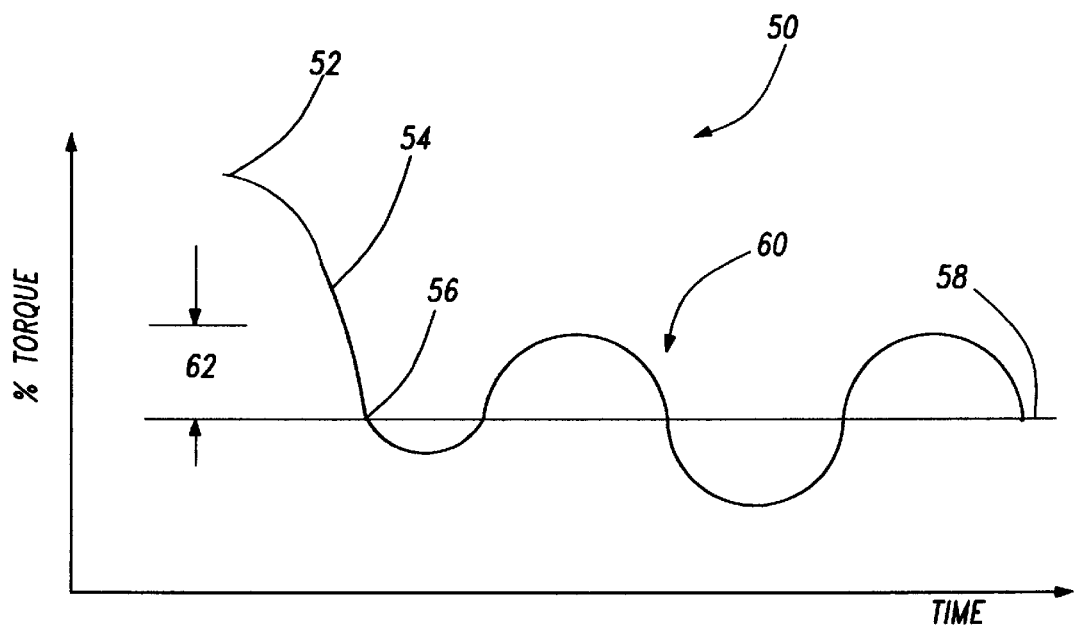
FIG. 2 is a graphic illustration of an implementation of a method of this invention.

FIG. 2 illustrates one implementation of the method of this invention. FIG. 2 includes a plot 50 of a torque value versus time. When the vehicle is in a currently engaged gear, there is an initial current torque value 52 at the beginning of a desired shift. The controller 40 has information, in the form of a look-up table for example, that indicates the conditions necessary to achieve a zero torque condition, given the currently engaged gear. The controller 40 causes the current torque value to descend as illustrated at 54 until it reaches a point 56 where the current torque value is equal to a target torque value 58. The target torque value is that torque value that corresponds to having a zero torque condition that allows the driver to disengage the currently engaged gear. The descent from the initial torque value 52 to the point 56 preferably is an exponential decay function over time.

A slow decay rate is useful in most heavy duty vehicle transmissions under many driving conditions. A slow decay rate or gradual change in the torque value provides better performance than an instantaneous or ramped change to a desired torque value. The gradual change of this invention prevents the system from excessively overshooting the target torque value, which reduces transient dynamic activity and provides a smoother and more rapid transition.

Achieving the exponential decay preferably is accomplished by the controller 40. Electrical signals are utilized by the controller 40 for controlling the rotational speed of the engine output shaft 26, which results in controlling the torque value of the transmission 24. The torque value preferably is changed by filtering the electronic signals that dictate the current torque value. The filter has a value that is determined based upon an overall gear ratio of the transmission. In general, lower gears, which have a high numerical ratio, will be associated with a filter value resulting in a longer decay time or a slower rate of change. Similarly, higher gears will have a filter value resulting in a faster decay rate. The specific filter value used will depend on the system parameters that contribute to determining the overall gear ratio of the transmission.

Lower gears usually have relatively lower resonant frequencies and slower decay rates are preferred to prevent excessive target torque overshoot. The resonant frequency generally is higher for higher gears so a faster decay rate is preferred. The chosen filter value will depend on the tradeoff between having a fast rate of change for a fast shift time and a slow rate of change to avoid the transient dynamics associated with excessive target torque overshoot.

Once the current torque value reaches the point 56, where it crosses the estimated zero torque line 58, a cyclical oscillating function 60 is implemented that varies the current torque value about the target torque value 58. The oscillating function 60 is most preferably a sine wave function over time. The sine wave function preferably has an amplitude 62 and a period that are dependent on the overall gear ratio of the transmission. In general, the amplitude and period are larger for lower gears. The amplitude and period preferably are set to avoid the resonant frequency of the vehicle powertrain to avoid excessive dynamics.

While the current torque value is oscillating about the target torque value, the drive train torque is relieved, so that the driver can manipulate the gearing arrangement 34 within the transmission 24 utilizing the shift lever 32. Oscillating or dithering the torque value about the target torque value is useful for an initial break torque function that relieves drive train torque so that the driver can move the shift lever from a currently engaged gear to a neutral position while braking or under throttle load. The dithering is also useful during a lever shift from neutral to the next desired gear so that the lever is moved and the gearing components 34 are fully seated before full torque is restored to the drive train.

Accordingly, the oscillating or dithering of the current torque value is only needed for a certain amount of time. When the method of this invention is utilized for the two scenarios just described, the dithering function continues until a neutral condition of the transmission 24 is confirmed or a predetermined time period to achieve a break torque function has elapsed. When either of these conditions are met, the controller 40 transitions the function of the system 20 to other requests.

Dithering is utilized to compensate for possible inaccuracies in determining the target "zero torque" value. By oscillating about an estimated target, this invention assures that the necessary zero torque condition will be achieved.

The example of FIG. 2 is useful when a current torque value associated with a currently engaged gear is considered to be a high torque value. When it is necessary to approach a target torque value from a relatively low currently engaged torque value, a slight modification of the method of this invention is preferred.

Figure 3:
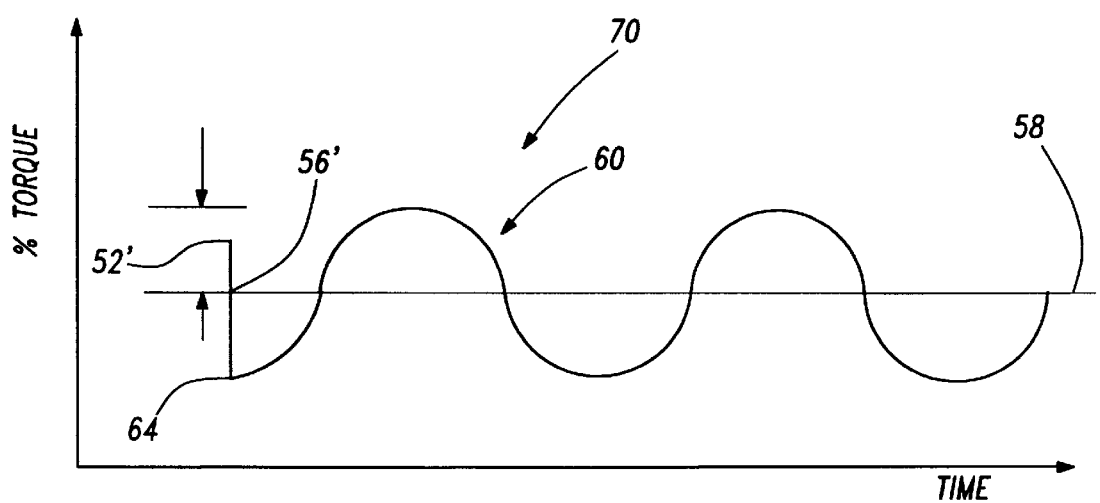
FIG. 3 is a graphic illustration of another implementation of a method of this invention.

FIG. 3 illustrates a plot 70 of a torque value versus time. In this example, the initial torque value 52' is relatively low compared to the initial torque value 52 of FIG. 2. Since the initial torque value 52' in FIG. 3 is relatively close to the target torque value 58, the controller 40 commands the current torque value to change to a value opposite the target torque line 58 from the initial value 52'. In other words, the current torque value is changed from the initial value 52' to the value illustrated at 64. The transition from the point 52' to the point 64 includes crossing over the target torque value line 58 at the point 56'.

The torque value at the point 64 preferably is equal to the difference between the target value and a dither torque value. The dither torque value is preferably equal to the amplitude of the sinusoidal wave 60. The dither torque value is determined based upon an overall gear ratio of the transmission 24. The current torque value is then dithered or oscillated cyclically about the target torque value 58 for a period of time as described above.

As can be seen, this invention includes a method for achieving a zero torque condition in a transmission that allows a driver to more readily and easily effect a gear change. The exponential decay from an initial value to a target value and the use of a cyclically oscillating dithering function over time render a gear change more readily achieved while reducing the possibility for causing undesirable wear on the components of the transmission 24.

The foregoing description is exemplary rather than limiting in nature. Variations and modifications to the disclosed embodiment may become apparent to those skilled in the art that do not necessarily depart from the purview and spirit of this invention. Accordingly, the legal scope of protection given to this invention can only be determined by studying the following claims.

We claim:

1. A method of controlling a torque value in a vehicle transmission, comprising the steps of:

(A) determining a target torque value;

(B) determining an initial current torque value that is indicative of a current transmission condition;

(C) changing the current torque value by filtering a signal that is used for adjusting an engine variable so that the current torque value approaches the target torque value;

(D) determining when the current torque value reaches a preselected value relative to the target torque value; and (E) cyclically oscillating the current torque value about the target torque value as a function of time having a determined amplitude and period by adjusting an engine variable until a known transmission condition exists.

2. The method of claim 1, wherein step (C) is performed by the substep of determining a magnitude of the initial current torque value to thereby determine whether the initial torque value is a high torque value or a low torque value.

3. The method of claim 2, wherein the initial current torque value is a high torque value and step (C) is performed by gradually changing the current torque value using an exponential decay function over time so that the current torque value approaches the target torque value.

4. The method of claim 3, wherein step (C) includes choosing a filter to perform the filtering as a function of an overall gear ratio in the transmission.

5. The method of claim 3, wherein step (D) is performed by determining when the current torque value matches the target torque value from step (A).

6. The method of claim 5, wherein step (E) is performed by the substeps of determining the amplitude and period as a function of an overall gear ratio of the transmission.

7. The method of claim 5, wherein the amplitude is equal to a determined dither torque value.

8. The method of claim 1, wherein step (A) is performed by determining a torque value that corresponds to a zero torque condition between an engine and the transmission.

9. The method of claim 1, wherein the known transmission condition is one of a condition where the transmission is in neutral or a condition where a time period associated with a break torque function has elapsed.

10. The method of claim 1, wherein step (C) is performed using a filter having a first filter value for selected gear ratios and a second filter value for other gear ratios.

11. A method of controlling a torque value in a vehicle transmission, comprising the steps of:

(A) determining a target torque value;

(B) defining a first condition wherein a current torque value is greater than the target torque value;

(C) defining a second condition wherein a current torque value is less than the target torque value;

(D) determining whether the first or second condition exists;

(E) when the second condition exists, changing the current torque value to a start dithering torque value that is equal to a sum of a determined dither torque value and the target torque value by adjusting an engine variable;

(F) when the first condition exists, changing the current torque value to a start dithering torque value that is equal to a difference between the target torque value and a determined dither torque value by adjusting an engine variable; and (G) cyclically oscillating the current torque value about the target torque value as a function over time beginning with the start dithering torque value by adjusting the engine variable, the function having a determined amplitude and period until a determined transmission condition exists.

12. The method of claim 11, wherein the target torque value corresponds to a zero torque condition between the transmission and an associated engine that is adapted to drive the transmission and wherein the determined condition of step (F) is one of a condition wherein the transmission is in neutral or a condition wherein a time period to perform a break torque function has elapsed.

13. The method of claim 11, wherein step (F) is performed by the substeps of determining an amplitude and period of the function over time using an overall gear ratio of the transmission.

14. A method of controlling a torque value in a vehicle transmission, comprising the steps of:

(A) determining a target torque value;

(B) determining a second torque value that is different from the target torque value;

(C) determining a current torque value;

(D) determining whether the current torque value is above or below the second torque value;

(E) changing the current torque value by adjusting an engine variable using a first function when the current torque value is below the second torque value so that the current torque value approaches the target torque value; and (F) changing the current torque value by adjusting an engine variable using a second function when the current torque value is above the second torque value so that the current torque value approaches the target torque value.

15. The method of claim 14, wherein the second torque value of step (B) is above the target torque value of step (A).

16. The method of claim 14, wherein step (E) includes gradually decreasing the current torque value so that it moves from the current torque value toward the target torque value.

17. The method of claim 16, wherein step (E) includes filtering a signal that is used to control the engine variable.

18. The method of claim 14, wherein step (D) includes changing the current torque value to a value above the second torque value and subsequently moving the current torque value toward the target torque value.

* * * * *